Patented June 15, 1926.

1,589,330

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

AQUEOUS EMULSION CONTAINING ELECTRODEPOSITABLE RUBBER AND A CELLULOSIC COMPOUND.

No Drawing. Application filed April 7, 1925. Serial No. 21,339.

This invention relates to aqueous emulsions from which rubber and one or more cellulosic compounds are electrodepositable. One object of the invention is to provide an emulsion from which rubber and a cellulosic compound may be quicky and inexpensively electrodeposited simultaneously upon articles having conducting surfaces in accordance with the process disclosed in our copending application, Serial No. 21,341, filed April 7th, 1925, for electrodeposition of coatings comprising rubber and a cellulosic compound. Another object of the invention is to provide an aqueous emulsion, having in the disperse phase unvulcanized rubber and a cellulosic compound together with a vulcanizing agent whereby the rubber may be vulcanized after it is deposited with the cellulosic compound and vulcanizing agent. Another object of the invention is to provide a process for making such emulsions. Other objects will hereinafter appear.

We have found that aqueous emulsions may be prepared, containing in the disperse phase electrodepositable rubber and one or more cellulosic compounds, these being depositable simultaneously, together with a vulcanizing material which is also preferably present in the disperse phase. We have likewise found it useful to have present a coalescing agent for the cellulosic compound, which will tend to blend the particles of cellulosic compound together after they are deposited. While our invention can be embodied in many different ways, we shall give the preferred one by way of example, but it will be understood that the invention is not limited to this illustration except as indicated in the appended claims.

In general we prefer to first provide separate aqueous emulsions of unvulcanized rubber, of vulcanizing material, such as sulfur, and of cellulosic material. For the rubber emulsion we may employ, such an emulsion as that disclosed in our Patent No. 1,476,374, granted Dec. 4, 1923, for electrodeposition of rubber coatings. Or we may use rubber latex having about 30% of rubber therein, and preferably stabilized by being made alkaline, say with ammonia for instance.

The sulfur emulsion is readily prepared by mixing 20% of comminuted sulfur, say flowers of sulfur, into a .5% solution of glue in water. The mixture is then given intensive agitation, say in one of the high-speed colloid mills now on the market.

We may prepare the emulsion of one or more cellulosic compounds as follows. For example, 50 parts of cellulose nitrate are dissolved in 150 parts of amyl acetate. One part of a protective colloid, such as glue or gum arabic is mixed, along with 15 parts of an emulgent like Turkey red oil, in 1000 parts of water. The solution of cellulose nitrate in amyl acetate is then thoroughly mixed into the aqueous bath. Finally the mixture is homogenized by intensive agitation, as in any of the well known colloid mills. Instead of nitrocellulose we may use 50 parts of chloroform-soluble acetate dissolved in 150 parts of chloroform or 50 parts of acetone-soluble cellulose acetate dissolved in 150 parts of acetylene tetrachloride. In the case of cellulose ethers, such as water-insoluble ethyl cellulose, we can dissolve 50 parts in 150 parts of a mixture of equal weights of benzol and ethyl alcohol. Such solutions are stirred into the aqueous bath, containing the colloid and emulgent, and then homogenized in the same way that the solution of nitrocellulose was treated. An emulsion containing nitrocellulose and acetyl cellulose can be prepared by dissolving 25 parts of one and 25 parts of the other together in 150 parts of acetone and then proceeding as above described.

The above described emulsions of unvulcanized rubber, sulfur, and cellulosic compound, are then mixed together and the the mixture finally homogenized by running it through a suitable colloid mill. A low-speed paint mill is satisfactory.

The mixed emulsion thus produced can be effectively used for electrodeposition and subsequent vulcanization in the way described in our above cited patent. We prefer, however, to provide in the emulsion an accelerator of vulcanization, such as diphenyl guanidine and one or more pigments such as carbon black, nigrosine and zinc oxide. These materials may be mixed into a ½% solution of glue and then homogenized in a colloid mill. We find it convenient to prepare an 8% emulsion of diphenyl guanidine, a 4% emulsion of carbon black, a 2% emulsion of nigrosine, and a 20% emulsion of zinc oxide.

The various emulsions hereinabove described, preferably slightly alkaline in reaction, may be combined in differing proportions. We find the following to be convenient,—4000 parts of a 30% rubber latex, 1000 parts of the sulfur emulsion, 1000 parts of the cellulosic compound emulsion, 1000 parts of the diphenyl guanidine emulsion, 3000 parts of the carbon black emulsion, 500 parts of the nigrosine emulsion and 1000 parts of the zinc oxide emulsion.

The aqueous emulsion thus produced, comprising in its disperse phase electrodepositable unvulcanized rubber, vulcanizing material, cellulosic compound, with or without coloring matter and accelerator may be readily electrodeposited upon conducting surfaces by bringing the latter into contact with the emulsion and passing an effectively unidirectional current through the surface and emulsion at approximately 110 volts, with a current density of about ⅓ of an ampere per square inch.

It will be noted that the solvent of the cellulosic material in the droplets containing the latter may enter into the deposited coating with the cellulosic compound and tend to coalesce the particles of the latter together. Of course during vulcanizing or during the drying preceding such step, this coalescing agent may be wholly or partially driven off; but it assists the amalgamation of the different elements of the coating prior to vulcanization.

Having thus described our invention, what we claim as new and desire to secure by Letters Patent is:

1. An aqueous emulsion comprising in the disperse phase electrodepositable rubber and a cellulosic compound.

2. An aqueous emulsion containing in the disperse phase electrodepositable unvulcanized rubber, vulcanizing material, and a cellulosic compound.

3. An aqueous emulsion containing in the disperse phase electrodepositable unvulcanized rubber, vulcanizing material, a cellulosic compound, and a coalescing agent for the latter.

4. In the process of making an aqueous emulsion comprising electrodepositable rubber and a cellulosic compound in the disperse phase, the steps of mixing an aqueous emulsion of rubber with an aqueous emulsion of cellulosic material, and homogenizing the mixture by agitation.

5. In the process of making an aqueous emulsion containing in the disperse phase electrodepositable unvulcanized rubber, vulcanizing material, and a cellulosic compound, the steps of mixing aqueous emulsions of unvulcanized rubber, of vulcanizing agent, and of a cellulosic compound, and homogenizing the mixture by agitation.

6. In the process of preparing an aqueous emulsion of electrodepositable unvulcanized rubber, vulcanizing material, a cellulosic compound, and a coalescing agent therefor, the steps of mixing an aqueous emulsion containing in the disperse phase said cellulosic compound and said coalescing agent, with an aqueous emulsion containing in its disperse phase said unvulcanized rubber and said vulcanizing material, and finally subjecting the mixture to agitation until it is homogenized.

Signed at Rochester, New York, this 2nd day of April, 1925.

SAMUEL E. SHEPPARD.
LEON W. EBERLIN.